UNITED STATES PATENT OFFICE.

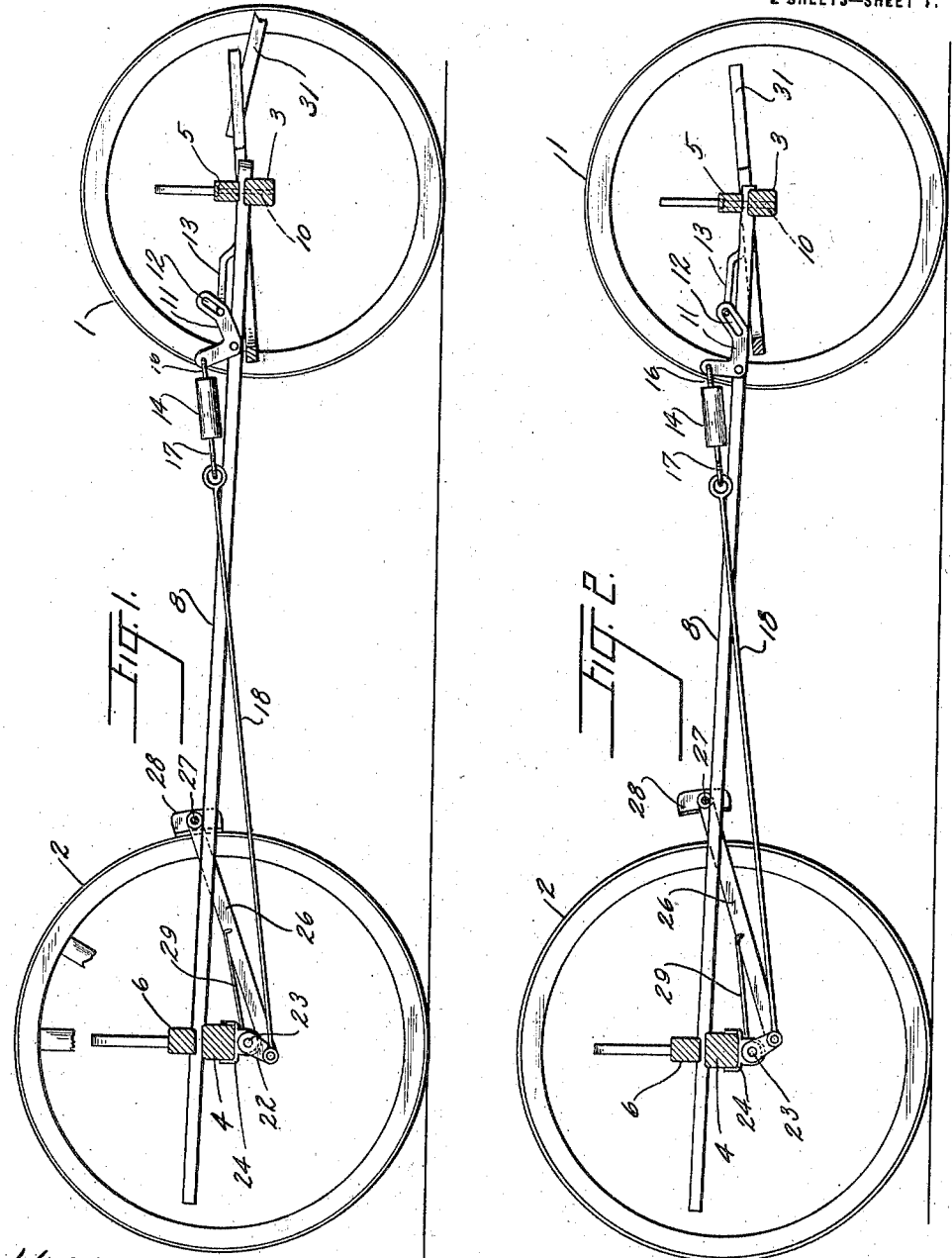

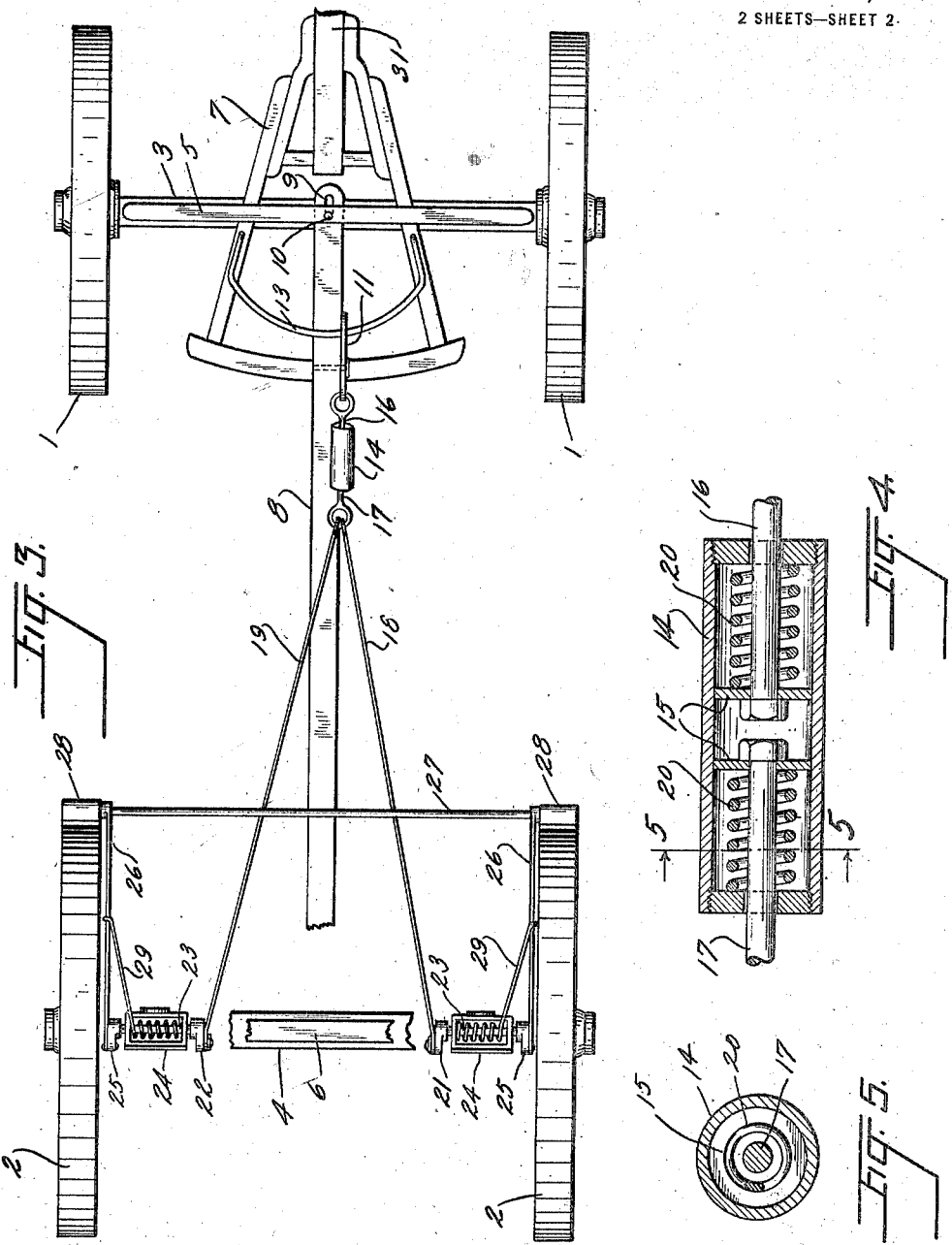

GUSTAV BECKER ONKEN, OF FERGUS FALLS, MINNESOTA.

VEHICLE-BRAKE.

1,249,811. Specification of Letters Patent. Patented Dec. 11, 1917.

Application filed March 23, 1916. Serial No. 86,285.

*To all whom it may concern:*

Be it known that I, GUSTAV B. ONKEN, a citizen of Germany, residing at Fergus Falls, in the county of Otter Tail and State of Minnesota, have invented certain new and useful Improvements in Vehicle-Brakes, of which the following is a specification.

This invention relates to improvements in vehicle brakes of the class known as "automatic"; the purpose of the invention being to provide a brake that, on down grade, will operate to set itself as the vehicle shows a tendency to descend the grade through gravity. When the level road or up-grade is reached the pull of the team will automatically release the brake and permit progress of the vehicle without hindrance. Other objects attained are simplicity in construction, cheapness of manufacture, durability and efficiency.

With the foregoing and other objects in view the invention consists in the combination and arrangement of parts to be hereinafter fully described in this specification, pointed out in the claims and illustrated in the accompanying drawings which form a part of said specification and in which—

Figure 1 is a longitudinal sectional view of a vehicle equipped with my improved brake which is shown in operative position.

Fig. 2 is a similar view showing the brake released.

Fig. 3 is a plan view of the same.

Fig. 4 is an enlarged longitudinal sectional view through the shock absorber employed.

Fig. 5 is a cross section taken on line 5—5 of Fig. 4.

Like reference characters denote corresponding parts throughout the several views.

The reference numeral 1 denotes the front wheels, 2 the rear wheels, 3 and 4 the front and rear axles, respectively, of a vehicle of ordinary construction. This vehicle, further, comprises the usual front and rear bolsters 5, 6 and the hounds 7 and the reach 8 which is formed with an elongated slot 9 through which the pin 10 passes that connects the front bolster and axle 3. To the reach 8 a bell-crank-lever 11 is secured and formed with a bent termination slotted longitudinally as at 12 to permit its engagement with the cross rod 13 of the hound 7. A housing or casing 14, having movable partitions 15, is connected by an eye-bolt 16 with said bell-crank-lever while another eye-bolt 17 connects said casing 14 with pull rods 18, 19; said eye-bolts being encircled by springs 20 which abut the casing-ends and the movable partitions 15, 15 to form a shock absorbing medium to equalize any uneven pull of the draft animals.

The pull rods 18, 19, aforesaid, are connected, respectively, to crank-arms 21, 22 fast upon transverse transmission rods 23 journaled in brackets 24 secured to the rear axle 4, said transmission rods, further, being provided with terminal crank-arms 25 which are connected by links 26 with a brake rod 27 carrying brake shoes 28 adapted for engagement with the rear wheels 2. The links 26 aforesaid, are connected by springs 29 the body portions of which are wound about the rods 23 and terminally secured to the brackets 24.

The operation of the brake is as follows: On a level or up-grade road the team pulling upon the tongue 31 moves the bolster 5 and pin 10 forward, relatively to the reach, until the pin 10 engages the forward end of the slotted portion 9 of said reach when the cross rod 13 pulls upon the slotted end of the bell-crank-lever and through its connections the crank-arms 21, 22 and rod 23 are moved from the position shown in Fig. 1 to that shown in Fig. 2 releasing the brake shoes 28 from the wheel 2 and overcoming the tension of springs 29. When the pull upon the reach is discontinued or when the draft animals offer resistance to a descent of the vehicle by gravity over a down grade the reach moves backward relatively to the bolster 5 and hounds thus relieving the "pull" upon the crank-arms 21, 22 and permitting, as well as assisting, the springs 29 to hold the rod 27 in engagement with the reach 8 and the brake shoes into frictional engagement with the wheels 2 thus stopping or hindering the forward movement of the vehicle.

What is claimed is:—

1. In a vehicle brake, a bell-crank-lever having one bent longitudinally slotted termination, transmission rods operatively secured to the rear axle of the vehicle, crank-arms carried by said transmission rods, connection between said crank-arms and said bell-crank-lever, brake shoes, connection between said brake shoes and said transmission rods whereby movement of the latter is imparted to the former members and means effecting connection between said transmission rods and said brake for yieldingly retaining said transmission rods in a determined position.

2. In a vehicle brake, transmission rods movably connected to the rear-axle, brake-shoes for engaging the vehicle-wheels, said transmission rods having terminal crank-arms, means of connection between the crank-arm terminals at one end of each transmission-rod and said brakeshoes, resiliently controlled connections between said transmission-rods and said means of connection between the brakeshoes and the transmission rods, a bell-crank having a bent longitudinally slotted terminal, a vehicle reach, connection between said reach and said bell-crank, and pull-rod connections between said bell-crank and the other crank-arm terminal of each of said transmission rods.

3. In a vehicle brake, transmission rods movably connected to the rear axle of the vehicle, brake-shoes for engagement with the vehicle wheels, crank-arms terminally secured to said transmission rods, links connecting said crank-arms and said brake shoes, means connecting said transmission rods and said links whereby the latter members are caused to yieldingly retain said brake shoes in engagement with the vehicle wheels, pull-rods connected to said transmission rods, reach rods connected to said transmission rods, and a bell-crank-lever fulcrumed upon the vehicle reach and operatively connected to said pull rods and to the vehicle hounds whereby the pull of draft animals upon the reach will operate to disengage said brake shoes from the vehicle wheels.

In testimony that I claim the foregoing as my own I have hereto affixed my signature in the presence of two subscribing witnesses.

GUSTAV BECKER ONKEN.

Witnesses:
F. W. MUIRE,
FRANK C. BARNES.